United States Patent [19]

Stofko

[11] 4,357,194
[45] Nov. 2, 1982

[54] STEAM BONDING OF SOLID LIGNOCELLULOSIC MATERIAL

[75] Inventor: John Stofko, 36 W. 320 River Grange Rd., St. Charles, Ill. 60174

[73] Assignees: John Stofko, St. Charles, Ill.; John Jansky, Paris, France

[21] Appl. No.: 254,224

[22] Filed: Apr. 14, 1981

[51] Int. Cl.³ .............................................. B32B 5/16
[52] U.S. Cl. .................... 156/308.6; 156/336; 264/123; 264/124; 425/405 R; 425/406
[58] Field of Search ............... 264/109, 123, 124, 120; 106/123 CR; 156/62.2, 308.8, 308.2, 307.1, 308.6, 285, 336; 162/175; 415/405 R, 406

[56] References Cited

U.S. PATENT DOCUMENTS

| 2,557,071 | 10/1945 | Boehm . | |
|---|---|---|---|
| 2,984,578 | 5/1961 | Glab . | |
| 3,208,864 | 9/1965 | Glab . | |
| 3,280,237 | 10/1966 | Corbin . | |
| 3,295,167 | 7/1979 | Corbin . | |
| 3,619,450 | 10/1971 | Futo . | |
| 3,668,286 | 6/1972 | Brooks et al. | 264/26 |
| 3,677,850 | 7/1972 | Holt et al. | 156/62.2 |
| 3,686,383 | 8/1972 | MaKinen . | |
| 3,880,975 | 4/1975 | Lundmark | 264/120 |
| 3,891,738 | 6/1975 | Shen | 264/120 |
| 4,107,379 | 8/1978 | Stofko | 264/109 |
| 4,111,744 | 9/1978 | Reinige | 264/123 |
| 4,162,877 | 7/1979 | Nyberg . | |
| 4,183,997 | 1/1980 | Stofko | 264/109 |
| 4,193,814 | 3/1980 | Shen . | |

Primary Examiner—Michael W. Ball
Attorney, Agent, or Firm—Karl W. Flocks; Sheridan Neimark

[57] ABSTRACT

Composite products are formed, such as of lignocellulosic particles, by bonding through the transformation of added sugars and/or starches together with lignin and/or other phenolic containing materials, with the optional presence of added catalyst, the transformation causing the composition to convert into a furan-lignin type binder in situ by heat and pressure. The bonding composition is suitably activated by contact with live steam.

12 Claims, 2 Drawing Figures

STEAM BONDING OF SOLID LIGNOCELLULOSIC MATERIAL

FIELD OF THE INVENTION

The present invention relates to the consolidation of wood particles and the like, and is an improvement of the inventions disclosed in the Stofko U.S. Pat. Nos. 4,107,379 and 4,183,997.

BACKGROUND

In the Stofko U.S. Pat. Nos. 4,107,379 and 4,183,997 there are disclosed procedures for bonding lignocellulose materials including wood particles by the use of carbohydrates as adhesives. The sugars and starches used as the adhesives for the lignocellulosic materials are transformed by acidic and/or alkaline catalysts to water insoluble binders in situ by heat and pressure. It is believed that bonding is effected by chemical transformation of the carbohydrates to furans and the coupling of such furans with the lignin or other phenolic materials which are present on the surface of the lignocellulose. In view of the fact that it is known that in the presence of acids lignin becomes more reactive, it is theorized that the natural lignin present on the lignocellulose materials is activated by acidic catalyst.

It has also been previously known that furfural produced from pentose sugars or hydroxymethyl furfural produced from hexose sugars or starches react with phenols to produce phenol-furfural condensation resin. These resins have been produced commercially in the past.

In the consolidation of the lignocellulose materials, pressure has normally been applied by the use of massive presses with heat being provided by conduction through the press face to the lignocellulose materials under compaction. However, the use of steam in direct contact with the lignocellulosic material is not entirely unknown, and steaming apparatus for the consolidation of composite products are disclosed in Corbin U.S. Pat. Nos. 3,295,167; Shen 3,891,738; and Nyberg 4,162,877. Insofar as is known, in all the prior systems which have directly contacted the lignocellulosic material with steam, the conventional resins such as phenol-formaldehyde condensation product has always been used. These prior attempts have not solved the problem of providing superior particle board at the lowest possible price.

SUMMARY

It has now been determined that the bonding systems of the Stofko U.S. Pat. Nos. 4,107,379 and 4,183,997, in particular the furan-lignin type binder, can be developed in situ in a superior manner to produce a superior and less costly product, during the consolidation by heat and pressure on the particle surfaces to be bonded by the use of steam as the heating medium in direct contact with the lignocellulose particles, the binder being formed from added materials containing sugars and/or starches and native or added lignin and developed by steam from lignocellulose or added acidic catalyst.

It has been established that if lignocellulosic material, covered by discontinuous or a continuous film of sugars and/or starches, is in compacted state exposed to high pressure steam or wet heat, transformation of sugars and/or starches to binder, insoluble in water, is achieved without added acidic catalyst or with less acidic catalyst or with weaker acidic catalyst such as weak organic acids or salts thereof, or weak solid nondifusible acids such as sulfonated or other acidic groups containing aromatic compounds. Furthermore, it has been found that bond strength and consistency in some cases can be enhanced if lignin or other phenolic materials containing lignin or compounds are added together with sugars and/or starches to lignocellulose. Such added phenolics, together with native lignin, present on the surface of lignocellulose, participate in the formation of lignin-furane binder.

If a mixture of materials containing sugars and/or starches with lignin and/or other phenolics are deposited on the lignocellulosic surfaces to be bonded, and the coated articles are then exposed to high pressure steam for a short period of time, a strong bonding is obtained without any catalyst being added.

Moreover, it has been found that if lignocellulosic surfaces to be bonded are covered with a continuous or discontinuous film of starch or mixture of starch and sugar containing materials, and exposed in compacted state to high pressure steam for a short period of time, a strong bonding is obtained without any added lignin and catalyst.

It is very well known that sugars and starches are easily soluble in cold water. The adhesive bond provided by an adhesive made of sugars and/or starches without acidic catalyst or with weak acid as a catalyst, is not waterproof. Thus, if lignocellulosic particles intermixed with starches, or starches and sugars without catalyst or with weak acid (such as oxalic or citric) as catalyst are consolidated by open pressing even at high temperature and for long periods of time, a waterproof bond is not obtained and the resultant particle board disintegrates upon soaking in cold water. Accordingly, the waterproof bond between particles generated by high pressure steam in accordance with the present invention can be explained only by some unknown chemical coupling reaction of starches and sugars with lignocellulose.

Thus, it appears that under the effect of high pressure steam more of the native lignin in the lignocellulose particles becomes available for the reaction with sugars and/or starches then under the dry heat conditions which are provided under conventional open pressing. It has previously been known that at high temperatures and moisture content lignin becomes more reactive, probably because it is to some degree solubilized, and acted upon by organic acids such as acetic and formic acids, generated from the lignocellulose by wet heat, but this phenomenon has not previously been recognized as being capable of providing a mechanism for water resistant bonds between wood constituents and sugars or starches.

Transformation of starches and/or sugars to solids insoluble in water under the effect of high pressure steam can be explained by the generation of natural catalysts from lignocellulose capable of catalyzing such transformation and coupling the transformation products to the native lignin or other phenolic compounds present. Acetic acid and formic acid as well as other compounds generated by steam may have such a catalytic effect at high temperature.

It is, accordingly, an object of the present invention to overcome deficiencies in the prior art, such as indicated above.

It is another object to provide superior and less expensive board from lignocellulosic materials and particularly lignocellulosic particles.

It is yet another object to provide an improved process and apparatus for making such superior board in a less costly manner.

It is a further object of the invention to make water resistant board from lignocellulosic materials using steam in direct contact with the particles to convert polysaccharides into a water insoluble adhesive.

It is yet a further object of the invention to make water resistant board from lignocellulosic material by conversion of a mixture of carbohydrates or polysaccharides and lignin or other polyphenolic compounds into a water insoluble adhesive.

These and other objects and the nature and advantages of the instant invention will be more apparent from the following detailed description, taken in conjunction with the drawing.

DETAILED DESCRIPTION OF EMBODIMENTS

Figure 1:
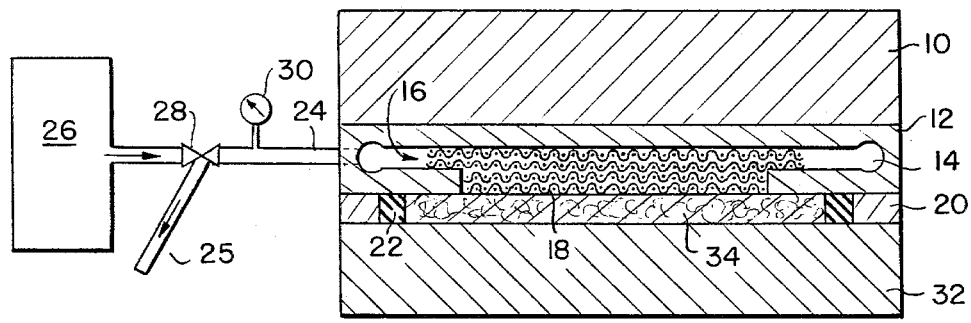
FIG. 1 is schematic cross-sectional view of a first apparatus for use in carrying out the invention.

According to one embodiment of the invention, surfaces to be bonded are covered either by a continuous or discontinuous film, e.g. by a mist of droplets, of a mixture of materials containing sugars and/or starches, plus lignin or other phenolics, and with or without a separate acid or alkaline catalyst as disclosed in the Stofko U.S. Pat. Nos. 4,107,739 and 4,183,997, depending on the nature of the phenolic and the curing system used. The so coated surfaces are brought into contact with other lignocellulosic surfaces, themselves either similarly coated or not, and the so contacting surfaces are consolidated by heat and pressure for a time sufficient to effect the bonding by chemical transformation reaction of the components.

While the invention is described in relation to the bonding of lignocellulosic materials, it will be understood that bonding compositions in accordance with the invention comprising sugars and/or starches intermixed with lignin and/or other phenolics, can also be used for the bonding of a wide variety of organic or inorganic materials such as glass and other mineral fibers, foundry sands, rubber and many other substances, either by themselves or in admixture with one another or in admixture with lignocellulose. If the lignin or phenolic material is of the active type, such as one containing sulfonic or other acidic groups, or if high pressure steam is brought into direct contact with the adhesive during the bonding period, no additional catalyst need be added to effect the bonding reaction.

Bonding compositions for use in the present invention and containing sugars and/or starches, lignin and/or other phenolics, and catalysts such as of the types disclosed in the Stofko U.S. Pat. Nos. 4,107,379 and 4,183,997, can be applied to the surfaces to be bonded in a variety of ways. For example, such compositions can be used in liquid form such as in water solution-suspension, or in powder form, produced from liquid by hot spraying. Liquid formulations can be applied either hot or cold, and the surfaces to be bonded can also be either hot or cold. If desired, such compositions can be partially pre-cured by heating to temperatures to 212°–300° F. (100°–150° C.) for 30–120 minutes, and the moisture content can thereby be reduced and the tackiness of the composition increased. Surfaces covered with the bonding formulation can be dried at higher temperatures up to 300° F. (150° C.) or up to 60 minutes to obtain partial pre-cure, reduction of moisture content or higher tackiness.

A wide variety of sugars, starches, lignins and other phenolic containing materials can be used in the present invention. It is not necessary to use pure substances, as impure and crude materials and mixtures including active and inert substances are fully satisfactory. Active substances enter into the bonding reaction and inactive ones act as fillers or extenders, it being understood that the quantity of active materials must be sufficient to accomplish the desired objective, and this can be determined by routine testing.

As examples of crude sugars there may be mentioned crushed, refined and milled sugar cane or sugar beet in slurry or water suspension, crude sugar cane or sugar beet molasses, wood molasses such as produced as by-products in some defibration processes or generated by wood hydrolysis, sugars generated by hydrolysis of hemi-celluloses in acidic pulping processes such as the sulfite process. As crude starch containing materials there may be mentioned crushed milled wheat or corn flour in powder or in water suspension; wheat, potatoe or corn starches; dextrin and others. Examples of pure sugars and starches which can be used either alone or in admixture are sucrose, glucose, other monosaccharides, mixtures of mono, di- and/or polysaccharides such as sugar cane, amylose, amylopectin, etc. Various examples are given in the Stofko U.S. Pat. Nos. 4,107,379 and 4,183,997.

As sources of lignin or other phenolic compounds there can be used any kind of lignin containing material such as spent sulfite liquor or kraft spent liquor produced as wastes or byproducts in pulping wood, or lignin from wood alcoholysis, phenolysis or hydrolysis. Lignin produced by wood hydrolysis to sugars can be used in admixture with the sugars as obtained, without any separation. As natural phenolics there may be mentioned bark extracts containing phenolic acids, tannins, phlobaphenes, flavanoids or mixtures thereof, which phenolics can be used in place or in admixture with lignins.

The ratio of sugars and/or starches to lignin and/or other phenolics can vary widely and can depend upon the reactivity of the lignin or other polyphenolics. Normally, however, the weight ratio will vary from 1:9 to 9:1 of solid sugars/starches to solid lignins/phenolics.

If a separate catalyst is to be added to the adhesive composition, as may sometimes be desirable, there may be used a variety of acids, organic or inorganic, or acidic salts thereof or other compounds which are capable of catalyzing sugar transformation to furans, as noted in the aforementioned Stofko patents. Alternatively, it is more preferable to use phenolic compounds which already contain acidic groups, such as sulfonated lignin or sulfonated polystyrene. Such acidic catalysts are preferred as they do not diffuse into the wood and have a less degrading effect on the cellulose of the wood. Where catalyst is used, it is preferably present in a amount of from 1–50% by weight based on sugars and starches present. The optimum ratio will depend on the identity of the sugars and starches and on the kind of catalyst selected, and such optimum ratio is determinable by routine testing.

The bonding composition may also contain other optional materials including other chemical reagents capable of affecting the bonding reaction, e.g. accelerating agents, retarding agents, plasticizers, crosslinking agents. As examples of such reagents there may be briefly mentioned amines such as hexamethylene-tetramine, vinyl monomers, styrene monomer, polyhydroxyalcohols, furfuryl alcohol, etc.

It is desirable to maintain the pH of the lignocellulose during consolidation at such level to prevent significant cellulose degradation, consistent with the teachings of Stofko, U.S. Pat. No. 4,183,997. Accordingly, where acid catalyst is used or acid lignin, it may be desirable to add alkali to the bonding composition to ensure that during the bonding the pH does not become less than the natural pH of wood, i.e. 3.5–5.5. For this purpose all three types of alkalis, namely hydroxides, carbonates and amines, have been found effective pH controlling agents. The amount of alkali to be added will depend on the kind and the amount of the acid catalyst and the pH of the substrate; and will vary from 0 up to 50% by weight of the acidic catalyst. The precise amount of alkali can be determined by routine testing.

The amount of bonding composition to be used is also subject to considerable variation, depending on the nature of the product, the surface roughness and the desired properties of the product. In the production of wood laminates such as plywood, the quantity of bonding composition will range between 2 and 30 grams of mixed solids per 1,000 $cm^2$ of the surface to be bonded. In the production of composite products such as particle board or fiber board, the quantity of bonding composition on dry basis will be between 1 and 15% of solids in the composition to 100% dry weight of substrate, again depending on the desired final properties.

Conditions in the press may also vary widely depending on a number of variables, such as the type of sugar/starch, type of lignin/other phenolic, type of wood, presence or absence of additional catalyst, and requirements of the product. As is usual in the pressing of wood products, the lower the temperature the longer the press time required, and vice versa. In general, the preferred temperature range is 285°–450° F. (140°–232° C.). The pressing time required under these conditions is the time needed to raise the temperature in the center of the product to a level of 320°–420° F. (160°–216° C.), the latter value depending on the kind and amount of catalyst.

In one embodiment of the invention, steam is brought into direct contact with the adhesive during the pressing operation. When live steam is used, and the substrate material to be bonded is lignocellulose, it has been surprisingly found that the lignin/phenolic component of the composition may be omitted, the live steam serving to produce natural catalysts and to activate the natural lignin/phenolics present on wood surface where it is then made available for reacting with the sugar/starch. Nevertheless, even where live steam is brought into contact with the bonding composition, it is still preferred that such composition contain lignin or other phenolic or crosslinking material, in order to obtain a superior bond.

Thus, lignocellulosic material is covered by a continuous film or a mist of starch containing material such as wheat flour, or with a mixture of starch and sugar containing material such as wheat flour and sugar cane molasses, or with a composition containing sugar/starch and lignin/other phenolic material with or without catalyst, and the so coated lignocellulose material is then compacted to a shaped product by pressure such as between two hot press plattens. In such compacted state, the composite may then be exposed also to high pressure steam, either by injecting steam into the interior of the composite while preventing the steam from escaping, such as by the use of seals, or by generating high pressure steam from moisture from the product under gas tight confinement for a short period of time. Then the steam is released from the product which is then removed from the press.

One means for gas tight confinement and steam injection is diagrammatically illustrated in FIG. 1 which is vertical sectional view of a press platten usable as described above. Mounted on the underside of an upper press platten 10 is a steaming plate 12 having an internal peripheral channel 14 extending thereabout, which channel 14 opens to an internal space 16. Filling the internal space 16 are a plurality of screens 18 or other steam pervious elements. Located below the steaming plate 12 and extending peripherally about the press is a suitable stop frame 20 which serves to control the thickness of the interior space in the press and within which space the lignocellulosic board is to be pressed. Extending externally of the stop frame 20 is a suitable heat resistant and flexible sealing member 22, suitably formed of materials such as silicone rubber. Leading to the channel 14 is a suitable steam pipe 24 connected to a suitable source of steam 26, the pipe 24 being provided along its length with a 3-way valve 28 and pressure gauge 30. A steam exit pipe 25 exists from the valve 28.

In use, the lignocellulosic material is provided with the coating of adhesive composition and the resultant assembly is placed in the press on top of a lower press platten 32, the edges of the molding space being defined by the rubber seal 22. The press plattens 10 and 32 are moved toward each other to close the press and in conjunction with the seal 22 the internal cavity becomes gas tight. Steam from the steam source 26 is injected into the lignocellulosic mass through the pipe 24, the channel 14 and the screens 18, thereby causing the adhesive particles to react and thus forming a lignocellulosic board 34. After the reaction has proceeded to a sufficient degree, the 3-way valve is turned to permit release of steam through exit pipe 25.

Bond strength comparable to that produced by conventional adhesives is developed in the product 34 if 5–15% of wheat flour based on dry wood, in powder or in water suspension, is dispersed on the wood particle surface, which after compacting by pressure are steamed using 120–250 psig (8–17 ATM) psig steam pressures for 15–300 seconds. This strength is achieved in conjunction with the steam without the composition containing added lignin/phenolic material, the steam serving to drive the natural lignin/phenolics from the interior of the wood particles and to catalyze or activate the reactants so that reaction occurs with the wheat flour. However, if the adhesive composition further comprises added lignin/phenolic material, the strength of the product is even greater.

Instead of injecting steam from an outside source, steam can be generated in situ from moisture in the product by evaporation when hot press plattens come into contact with the product, so long as conditions of gas tight confinement are maintained. Thus, under conditions of gas tight confinement between press plattens, generated steam is not allowed to expand and dissipate, and steam pressure is built up producing the same effect as injected steam, the only disadvantage being that the process takes a longer time.

Figure 2:
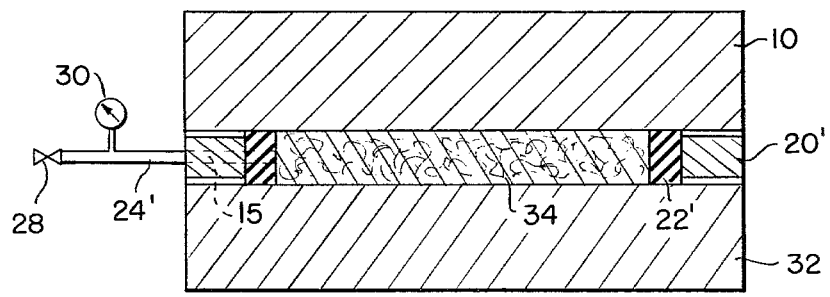
FIG. 2 is schematic cross-sectional view of a second apparatus for use in carrying out the present invention.

A suitable apparatus for effecting generation of steam in situ is schematically illustrated in FIG. 2 On the top press platten 10 is mounted a stop frame 20' carrying a suitable seal 22' desirably formed of silicone rubber. A steam exit pipe 24' is connected to the stop frame 20' and communicates with the interior of the press via a bore 15 extending through the stop frame 20' and then through the seal 22'. The steam exit pipe 24' carries a valve 28 and pressure gauge 30. As the board 32 is pressed, it being understood that moisture is present in the lignocellulose particles and/or the adhesive composition, moisture is gradually evaporated by heat input from the press plattens 10 and 32. When steam pressure of 120–220 psig (8–15 ATM) is reached, indicated by the pressure gauge 30, steam is released through the pipe 24' by opening the valve 28.

Alternatively, instead of adding starch containing material, a mixture of starch and sugar containing material, such as a mixture of wheat flour and sugar cane molasses or a mixture of starch, sugars and lignin or other natural phenolic containing materials, can be used. The composition can be dispersed on the surface of the lignocellulosic material in powder form or in the solution-dispersion form using water as a solvent or dispersant, it being understood that other solvents can also be used although water is by far preferred because of expense and safety considerations. The ratio of sugars, starches, lignins, other phenolics can be varied widely depending primarily upon the availability and cost, as noted above.

The invention will be described below by way of specific example, it being understood that such examples are presented illustratively and not limitatively.

EXAMPLE I

Wood particles of about 6% moisture content in a geometry used for core layer formation in commercial particle board were sprayed with a water solution-suspension containing 25% sugar molasses solids and 25% ammonium lignosulfonate solids, the amount sprayed being 168 grams of the mixture per 1,000 grams of lignocellulosic particles. After spraying the particles were dried to about 3% moisture content by hot air in an oven, and then a mat of 15×15 inches (38×38 cm) was hand formed by spreading a quantity of the coated particles needed to give a ¾ inch (19 mm) thick board of 0.72 specific gravity after consolidation. The particle mat was deposited on a metallic caul plate between press plattens heated to 450° F. (230° C.) and was compacted by pressure to ¾ inch (19 mm) thick particle board. A permanent bond was developed between the particles by raising the temperature in the center of the board to 410° F. (210° C.), which tool 10 minutes.

EXAMPLE II

Example I was repeated except that the particles were sprayed with a water solution containing 35% of sugar cane molasses solids and 15% douglas fir bark extract produced by extraction using 5% sodium hydroxide as an extraction solvent. The adhesive composition also contained 10% of ammonium nitrate as a catalyst. Permanent bond particle board was obtained.

EXAMPLE III

Example I was again repeated except that the particles were sprayed with a solution-suspension containing 25% sugar cane molasses solids, 25% kraft lignin solids and 10% ammonium nitrate catalyst. Again excellent results were obtained.

EXAMPLE IV

Mixed hardwood particles of about 6% moisture content and of geometry used for core layer formation in commercial particle board were sprayed with a solution-suspension containing 50% by weight of sugar cane molasses solids and 20% by weight of lignosulfonic acid, the latter serving as both a source of lignin and a catalyst. The adhesive was sprayed in an amount of 168 grams per 1,000 grams of particles. The particles were dried by hot air in the oven to about 3% moisture content and then a mat was hand formed to give a board, after consolidation, of a size 15×15×0.75 inches (38×38×1.9 cm) and of specific gravity 0.72. The particle mat was pressed between press plattens heated to 450° F. (230° C.) for 10 minutes to obtain the ¾ inch (19 mm) thick board, of good quality.

EXAMPLE V

The procedure of Example I was repeated except that the pre-adhesive composition comprised 25% sugar cane molasses, 25% sodium lignosulfonate and 10% hexamethylene tetramine. Excellent results were achieved.

EXAMPLE VI

Wood particles of about 6% moisture content and of geometry used for core layer formation in the manufacture of conventional particle board were intermixed with wheat flour powder in an amount of 94 grams of flour to 1,000 grams of wood particles. After mixing the particles were hand spread into a particle mat 15 inches by 15 inches (38×38 cm) and in an amount necessary to produce a ¾ inch (19 mm) thick board of 0.72 specific gravity after compaction. The mat was pre-pressed and then placed in a press equipped with a steaming plate of the type shown in FIG. 1. The press was closed and the mat was confined between press plattens 10 and 32, the internal space being sealed by the silicone seal 22. The valve 28 was opened and steam from steam source 26 was injected through the pipe 24 and through the screens 18 directly into the interior of the board 34. When steam pressure reached 180 psig, (12.25 ATM) as indicated by the pressure gauge 30, which took about 30 seconds, the valve 28 was closed and steam was held in the board for 90 seconds. The steam valve 28 was then turned to its third position to release steam from the press, and the de-steamed board 34 was then removed from the press.

EXAMPLE VII

Example VI was repeated except that the wood particles were first intermixed with wheat flour in the amount of 47 grams of flour to 1,000 grams of particles, followed by spraying with sugar cane molasses in the amount of 50 grams of molasses per 1,000 grams of particles. Using the apparatus of FIG. 1, the particles were steamed to 200 psig (13.6 ATM) steam pressure which was held in place in the board for 180 seconds. As in Example VI, excellent results were obtained.

EXAMPLES VIII–XI

Particle boards were manufactured by steam pressing according to Example VI using the following formulations for the binder composition:

Ex VIII: 25% sugar cane molasses plus 25% ammonium lignosulfonate.

Ex IX: 35% sugar cane molasses plus 15% douglas fir bark extract.

Ex X: 25% sugar cane molasses plus 25% kraft lignin.

Ex XI: 25% molasses, plus 25% sodium lignosulfonate.

Particle mat in each case was steamed to 200 psig (13.6 ATM) steam pressure and such pressure was maintained in the board for 180 seconds.

EXAMPLE XII

Wood particles were sprayed with a solution-suspension containing 35% wheat flour and 17.5% sugar cane molasses solids in the amount of 140 grams of the solution-suspension per 1,000 grams of wood particles. A particle mat 15×15 inches (38×38 cm) was hand formed in an amount to give ¾ inch (19 mm) thick board of 0.72 specific gravity after pressing. The mat was pre-pressed and then deposited into a press as shown in FIG. 2. The press was closed with the mat confined between the press plattens 10 and 32, the periphery being sealed by the silicone seal 22'. The press plattens were heated to 340° F. (172° C.). Moisture in the mat, amounting to about 12.5% at the beginning, was gradually evaporated and steam pressure was built up; after about 6 minutes the steam pressure reached 220 psig (15 ATM). At that the point the steam valve 28 was opened and steam released from the board, which was then removed from the press. A waterproof particle board of excellent properties was obtained.

EXAMPLES XIII-XVII

Particle boards were formed using sealed pressing according to Example XII, using the following binder formulations:

Ex XIII: 35% water suspension of wheat flour.

Ex XIV: 25% sugar cane molasses plus 25% ammonium lignosulfonate.

Ex XV: 35% sugar cane molasses plus 15% douglas fir bark extract.

Ex XVI: 25% sugar cane molasses plus 25% kraft lignin.

Ex XVII: 25% sugar cane molasses plus 25% sodium lignosulfonate.

In each case the particle mat was seal pressed to 220 psig (15 ATM) steam pressure in the board, which took about 6 minutes. Specimens were cut from the resultant particles boards, after cooling thereof, and the test pieces were subjected to analysis to give the following results:

| specific gravity | 0.698-0.750 |
|---|---|
| rupture modulus (psi) | 1450-2100 (100-148 Kgs/cm$^2$) |
| internal bond (psi) | 86-125 (6.05-8.78 Kgs/cm$^2$) |
| thickness swelling (%) after 24 hours soaking in water | 10-14.5 |
| thickness swelling (%) after 2 hours in boiling water | 21-27 |

It will be apparent from the above disclosure that the invention contemplates various interrelationships including:

(1) steam plus carbohydrate wherein the material being bonded is a lignocellulosic material;

(2) steam plus carbohydrate plus phenolic;

(3) steam plus carbohydrate plus phenolic plus acid catalyst;

(4) steam plus carbohydrate plus acidified phenolic;

(5) carbohydrate plus phenolic plus acid catalyst; and (6) carbohydrate plus acidified phenolic. In each case additional reagents may be used, such as accelerators, etc. as noted above.

It will be apparent to those skilled in the art that various changes may be made without departing from the scope of the invention and the invention is not to be considered limited to what is described in the specification.

What is claimed is:

1. In a method of bonding solid materials and thereby producing a waterproof bond, comprising providing on a surface of said solid material an adhesive-free bonding material comprising at least one sugar, starch or mixture thereof, and pressing surfaces of said solid material together at an elevated temperature and for a time sufficient to effect bonding by transformation reactions of the sugar, starch or mixture thereof, and wherein the time, temperature and pressure are sufficient to produce a waterproof bond, the improvement wherein:

said solid material is a lignocellulosic material, and during said pressing said lignocellulosic material is maintained in a sealed press and subjected to live steam to heat the interior of the solid material to about 320°-420° F., said live steam serving to generate natural catalysts and to activate phenolic material on surfaces of said lignocellulosic material, which phenolic material reacts under the effects of said steam with said sugar, starch or mixture thereof to produce said waterproof bond.

2. A method according to claim 1, wherein said phenolic material is a lignin.

3. A method according to claim 2, wherein said lignin is a lignin having an acid group attached thereto.

4. A method according to claim 4, wherein, during pressing, said solid material having on its surface said adhesive-free bonding material is subjected to live steam under pressure in a sealed press for a time sufficient to effect said waterproof bond.

5. A method according to any one of claims 1, 2 or 3 wherein during said pressing, said solid material is subjected in a sealed press to live steam from an outside source, said live steam penetrating into the interior of the product being pressed.

6. A method according to any one of claims 1, 2 or 3 wherein said pressing is effected in a sealed press in the presence of moisture, said pressing being carried out for a time sufficient to generate live steam within the interior of the product being pressed.

7. A method according to any one of claims 1, 2 or 3 wherein said adhesive-free bonding material also comprises an accelerating agent.

8. A method according to any one of claims 1, 2, 3 or 4 wherein said bonding material comprises a mixture of molasses and sulfonated lignin.

9. A method according to claim 1 for making plywood wherein said bonding material is applied at the rate of between about 2 and 30 grams of mixed solids per 1000 cm$^2$ of the surface to be bonded.

10. A method according to claim 1 for making particle board, wherein the quantity of bonding composition on dry basis is between about 1 and 15% solids based on 100% dry weight of lignocellulose particles.

11. A method according to claim 1 wherein steam pressures of about 120-250 psig are used and wherein steam pressure is maintained for about 15-300 seconds.

12. A method according to claim 1 wherein said bonding material also comprises an acidified phenolic substance.

* * * * *

UNITED STATES PATENT OFFICE
CERTIFICATE OF CORRECTION

Patent No. 4,357,194                Dated November 2, 1982

Inventor(s) JOHN STOFKO

It is certified that error appears in the above-identified patent and that said Letters Patent are hereby corrected as shown below:

Claim 4, line 1 (Column 10, line 35): After "according to claim" delete "4" and insert therefor --3--.

Signed and Sealed this

Fifth Day of April 1983

[SEAL]

Attest:

GERALD J. MOSSINGHOFF

Attesting Officer    Commissioner of Patents and Trademarks